United States Patent

[11] 3,624,714

[72] Inventor James E. Frassrand
 Arcadia, Calif.
[21] Appl. No. 31,258
[22] Filed Apr. 23, 1970
[45] Patented Nov. 30, 1971
[73] Assignee Dynasciences Corporation
 Los Angeles, Calif.

[54] PIEZORESISTIVE MINIATURE PRESSURE TRANSDUCER
 9 Claims, 5 Drawing Figs.
[52] U.S. Cl. ..................................................... 73/398 AR,
 73/406, 338/4
[51] Int. Cl. ..................................................... G01l 9/04
[50] Field of Search .......................................... 73/398 AR,
 406, 88.5 SD; 338/4, 5, 6

[56] References Cited
 UNITED STATES PATENTS
 3,434,090 3/1969 Chelner ........................ 338/4

Primary Examiner—Donald O. Woodiel
Attorney—Donald E. Nist

ABSTRACT: A miniature pressure transducer has an edge-supported flexible diaphragm with a semiconductor chip providing a bridge arrangement of the piezoresistive strain gauge areas bonded to its inner surface to position active tension gage areas at the center of the diaphragm and active compression gage areas at the periphery. The chip is also bonded along its outer periphery to the annular inner surface of the transducer body supporting the edges of the diaphragm to prevent slippage during deflection of the diaphragm, thus placing the effective compression gage areas of the chip outside of the neutral circle within the compression zone on the diaphragm.

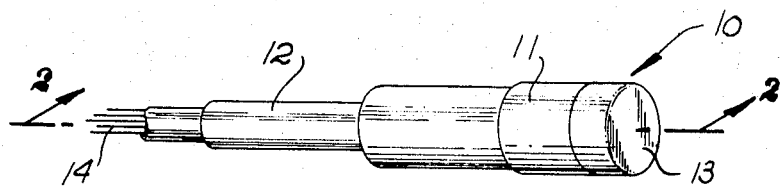
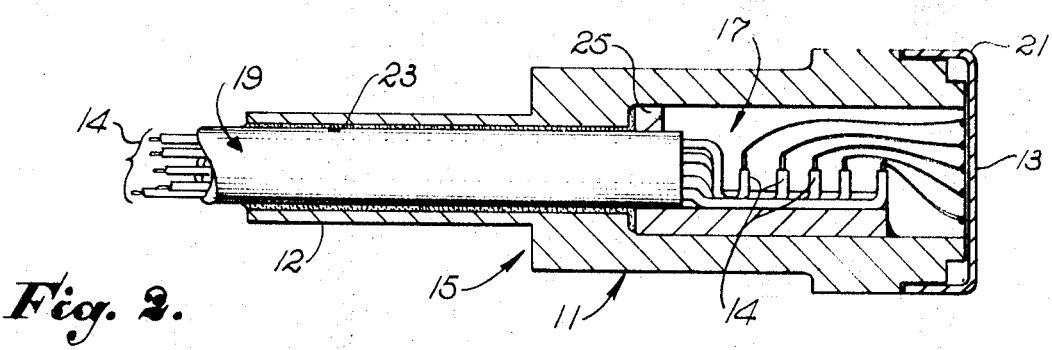
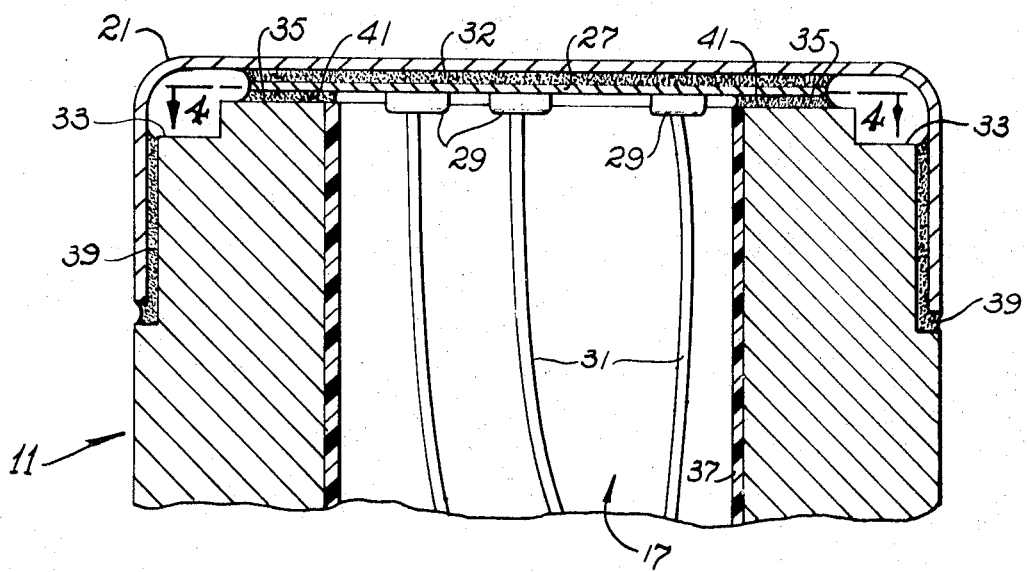
INVENTOR.
JAMES E. FRASSRAND
BY
Lewis M. Dalgarn
ATTORNEY INVENTOR.
JAMES E. FRASSRAND
BY
Lewis M Dalgarn
ATTORNEY.

PIEZORESISTIVE MINIATURE PRESSURE TRANSDUCER

BACKGROUND OF THE INVENTION

1. Field of the Invention

This invention relates to piezoresistive strain gauges employing semiconductive chips bonded to an edge-supported diaphragm for operation as a pressure transducer or the like.

2. Background of the Invention

Static and dynamic forces, particularly fluid pressures, are commonly measured using transducers with an edge-supported flexible diaphragm that deflects convexly or concavely in response to force differentials on its opposite faces. As the diaphragm is bowed inwardly, as by an increase in external pressure forces, a tension force is produced at the center of the interior diaphragm face and a compression force results near the edge. Piezoresistive strain gauges placed to measure these tension and compression forces on the diaphragm can thus be used to measure the diaphragm deflections as a function of these surface strains.

Preferably, piezoresistive strain gauge elements are bonded to the interior diaphragm surface to measure these strains. To maximize signal amplitude, the piezoresistive strain gauge elements are bonded to the diaphragm surface both near the center to measure tension stresses and near the periphery to measure compression, and are connected in an electrical bridge arrangement to produce an output signal with a high signal to noise ratio.

However, with conventional edge-supported diaphragms, the annular area of compressive stress extends only a short distance inwardly from the supporting edge. A circular neutral zone is located between the compression and tension areas only approximately one-third of the radial distance inwardly from the supporting edge, and maximum compressive strains occur very near the supporting edge. Therefore, with strain gauge bridge arrangements, although the tension gauges are easily disposed in the area of maximum stress near the center, considerable difficulty is encountered in placing the compression gauges close enough to the diaphragm edge to obtain suitable response.

With larger transducers, several approaches have been employed in the solution of this problem. In one such arrangement, as shown in U.S. Pat. No. 3,358,511 issued to D. W. Bargen on Dec. 19, 1967, the diaphragm is formed integral with the transducer body to have a thicker outer edge tapering to a thin center area which has the effect of transferring the maximum compression and neutral zones radially inward towards the diaphragm center so that the compression gauges can be located wholly within the outer compression area for maximum response. With another approach wherein a separate diaphragm is edge supported by the transducer body, the interior surface of the tubular transducer body is notched inwardly at the end supporting the diaphragm to allow placement of the compression gauges on the far outer edge of the diaphragm within the notch, thus avoiding the neutral zone, as shown and described in U.S. Pat. No. 3,473,375 to E. E. Jenkins issued Oct. 21, 1969. A third approach, as shown both in the last-mentioned patent and more fully in the U.S. Pat. No. 3,434,090 to H. Chelner issued Mar. 18, 1969, the compression gauge is formed in the shape of a U or M to reduce the radial extent of the required active gauge area at the edge of the diaphragm. In the last-mentioned patent, this feature is combined with the integral tapered diaphragm type of structure and certain other features to yield the desired measurement of the compressive strain.

Another development in this field has been the use of planar semiconductor diffusion techniques for forming the two compressive and two tension gauges with Wheatstone bridge connections integrated within a single semiconductive chip. The single chip can then be bonded to the interior of the diaphragm with input and output connections being made to contact areas at the ends of the active gauge portions. This has made possible very much smaller and more reliable transducer elements having overall diameters of less than 0.10 inches. With such small sizes, considerable difficulty has been encountered in maintaining a strong repeatable output signal with the relative decrease in the tension and compressive areas on the smaller diaphragm. The effective length of the strain gauges cannot be decreased much below 0.010 inches to produce an effective output level, and even then the compressive gauges should operate efficiently in measuring compressive strain to contribute as much as possible to the total output from the Wheatstone bridge.

However, with such small dimensions, the problem of compressive gauge placement is greatly magnified, while at the same time the approaches employed in solving this problem in the prior art also become increasingly impractical, if not impossible. For example, the walls of the transducer body would already be extremely thin so that little additional area would be gained by notching. Very precise and costly machining methods would have to be used to provide uniform tapered diaphragms to transfer compression area inwardly. Use of an M or multiple zigzag configurations to reduce the radial extent of the compression gauge would require extremely precise control of the diffusion techniques to prevent overlapping and shorting of the active and contact areas.

As a consequence, in most cases where such small strain gauges were required, the compression gauges actually detracted from the output signal produced by the tension gauges and served only as a dynamic thermal balance in the bridge. Moreover, with the single-chip construction of the gauge bridge, the chip is bonded to the diaphragm with a cementing agent which became subject to slippage in the high stress corner areas in the immediate vicinity of the inner supporting edge of transducer body. This had the effect of reducing output and also developing a negative hysteresis-type response for static loadings on the transducer.

SUMMARY OF THE INVENTION

The aforementioned difficulties of the prior art, particularly in producing miniature transducer elements, are overcome in a relatively simple inexpensive manner by use of a laminated structure in which the periphery of a flat semiconductive chip on which compressive gauge areas are formed is not only bonded to the inner diaphragm surface on one side but also bonded on its other side to the edge-supporting annular end surface of the tubular transducer body. In the preferred form, a unitary four-element silicon chip has a flat configuration with active piezoresistive areas extending between contact areas produced by planar diffusion techniques. The active areas forming the tension gauges constitute parallel strips near the center of the chip, while the compression gauges, preferably U-shaped are defined near the periphery of the chip at opposite ends of the tension gauge areas. The chip is bonded by suitable cement to the inner surface of the diaphragm. In the preferred embodiment, the diaphragm consists of a cup-shaped member having a tubular sleeve portion that is bonded to the outer surface of a tubular shaft forming the body of the transducer. The bottom portion of the cup-shaped diaphragm member provides a thin flat wall that is flexible in the central circular area overlying the hollow bore of the tubular transducer body to act as a diaphragm. The silicon chip with the piezoresistive active gauge areas and contact areas at one surface, has its opposite surface bonded to the diaphragm surface in the conventional manner, but with the outer periphery of the chip adjacent the compression gauge areas extending beyond the diameter of the internal bore in the tubular transducer body. The cement or bonding agent is applied to the annular end surface of the tubular transducer body at least in the area of the chip so that its outer periphery adjacent the compressive gauge is also bonded on its inner surface to the end surface of the transducer body. This additional bonding on the opposite side of the chip has the effect of extending the compression area on the diaphragm inwardly to insure that the active areas for the compression gauges lie on the outside of the neutral zone to generate maximum useful signal and of preventing slippage between the chip ends and the diaphragm in areas of high compressive strain. This results in a transducer response having increased linearity and repeatability with optimum output from the bridge arrangement to improve the signal to noise ratio.

BRIEF DESCRIPTION OF THE DRAWING

FIG. 1 is a slightly enlarged perspective showing the miniature pressure transducer in accordance with the invention;

FIG. 2 is an enlarged cross-sectional side view of the miniature pressure transducer of FIG. 1 illustrating the internal connection of the lead wires;

FIG. 3 is a greatly enlarged cross-sectional side view of the tip of the improved pressure transducer of FIGS. 1 and 2 showing the mounting details;

DETAILED DESCRIPTION

Figure 4:
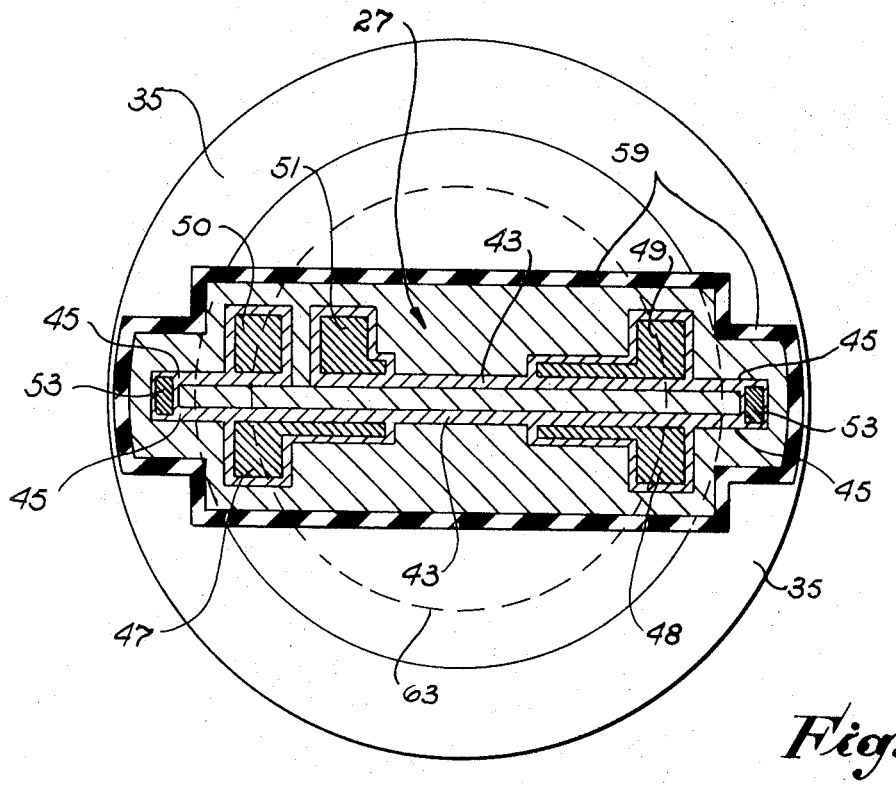
FIG. 4 is a partial top cross-sectional view of the improved pressure transducer of FIGS. 1-3 taken on the line 4—4 through the interior of one preferred form of silicon chip strain gauge bridge arrangement; and, FIG. 5 is a schematic circuit diagram showing the equivalent bridge circuit arrangement involved in the operation of the pressure transducer in accordance with the invention.

Referring now to FIG. 1, an improved miniature strain gauge pressure transducer 10 in accordance with the invention has a cylindrical body with active tip portion 11 at one end joined to a smaller diameter terminal extension 12 at the other end. A flat circular end surface 13 provides an active diaphragm area at its center to be contacted by the fluid or other medium in which pressure phenomena is to be measured. Individual lead wires 14 extend outward from the end of the terminal extension 12 to be connected to appropriate external electrical input and output circuitry.

Referring now to FIG. 2, a cylindrical transducer body structure 15 has a hollow cylindrical shape with a large internal bore 17 defined in the active tip portion 11 communicating with a coaxial smaller diameter internal bore 19 extending through the terminal extension 12. A thin-walled cup-shaped closure member 21, preferably cast of nickel alloy, fits over the end of the active tip portion 11. The thin cylindrical sidewalls of the cup-shaped closure member 21 slidably fit over the end portion of the transducer body 15 which has a slightly reduced outer diameter. As more fully described in connection with FIG. 3, the annular surface at the tip of the transducer body 15 supports the inner surface of the thin bottom wall of the cup-shaped closure member 21 giving edge support around a circular active diaphragm area that lies within the region of the enlarged cylindrical bore 17. As explained in more detail hereinafter, the semiconductive strain gauge elements are affixed to the inner gauge-supporting surface of the cup-shaped closure member 21 with contact leads 23 extending into the enlarged bore 17 for connection to an appropriate interior conductor arrangement.

In the preferred embodiment, the interior conductor arrangement consists of a five-conductor cable having five mutually insulated small-gauge cable wires 14 that extend through the smaller diameter bore 19 from the cylindrical space within the larger bore 17 to the end of the terminal section 12. The cable wires 14 within the cable are held in place and the reduced diameter bore 19 is sealed by epoxy cement that fills the entire cavity. The end of the cable 23 protrudes from the smaller bore 19 into the larger bore 17 passing through a circular opening the annular section of an L-shaped cylindrical insulator bracket 25 that is inserted into the large diameter bore 17 to be held in place against the interior shoulder formed at the junction of the larger and smaller diameter bores 17 and 19, respectively. The individual wires 13 emerging from the end of the cable have the covering insulation stripped back from the ends to expose the metal conductor for solder connection to one of the strain gauge leads.

The ends of the stripped cable wire 14 are affixed as by an epoxy cement along the elongated cylindrical portion of the L-bracket and spaced from one another for easy connection to the strain gauge leads.

In constructing the transducer, the conductor cable is pushed through the smaller diameter bore 19 and through the larger diameter bore 17 to emerge from the end of the active tip region 11. Then the cable end is inserted through circular opening in the L-bracket and the individual wires 14 are separated and the insulation stripped from the ends to be positioned along the elongated cylindrical portion of the L-bracket 25. The individual small-gauge wire leads from the strain gauge are then soldered in place on the appropriate exposed ends of the individual wires 14 with care being taken to maintain proper spacing between them. The cable is then pulled back into position with the annular end section of the L-bracket 25 against the internal shoulder, to which it is preferably affixed by cement, while the cup-shaped enclosure member 21, to which the gauges are attached as hereinafter described, is moved into position over the end of the active tip portion 11 of the transducer body structure 15.

As shown in more detail in the enlarged illustration of FIG. 3, a semiconductive strain gauge arrangement is initially bonded to the interior bottom surface of the cup-shaped closure member 21. In the preferred embodiment, the semiconductive strain gauge bridge arrangement, instead of constituting separate semiconductive chips bonded in the active diaphragm region, consists of a single monolithic semiconductive chip 27 containing active strain gauge areas defined between intermediate contact areas, as more particularly described with relation to FIG. 4. Metallic contacts 29 are plated or otherwise formed, as by use of an evaporation technique with etching, to cover the contact areas. A very small gauge lead wire 31, preferably of gold, has its end alloyed or soldered to the metal contact 29 with its other end soldered or otherwise connected to the exposed end of a respective one of the cable wires 14.

The entire surface of the chip 27 opposite the contacts 19 is coated with a uniform layer 32 of an appropriate adhesive material, such as an epoxy, phenolic or ceramic cement, that forms an extremely strong bond between the surface of the chip 27 and the adjacent interior bottom surface of the metal sheet material forming the cup-shaped closure member 21. As shown in FIG. 3, the end of the tip portion 11 of the transducer body preferably is formed with an annular shoulder 33 having an inner annular raised contact surface 35 providing the edge support for the active diaphragm area defined in the circular center portion of the thin bottom of the cup-shaped closure member 21. To prevent shorting of the gold contact leads 30 against the metal body structure 15, the interior surface of the large diameter bore 17 may be coated with a thin layer 37 of an appropriate insulating material such as a varnish or plastic. Before the end of the active tip portion 11 of the transducer body is inserted to be received within the sidewalls of the cup-shaped closure member 21, an appropriate adhesive 39, preferably of the same type forming the adhesive layer 31, is applied along the outer transducer body surfaces in the area of slightly reduced diameter, and also, or instead, to the adjacent interior sidewall surfaces of the cup-shaped closure member 21 to form a rigid seal. At the same time, a uniform adhesive layer 41 is applied either to the interior surface of the chip 27 in the areas overlapping the annular edge support 35 at the very end of the transducer body, or may also, or instead, be applied to the adjacent corresponding areas on the raised edge support surface 35, to form a strong bond between the transducer body and the opposite overlapping ends of the silicon chip 27. This results in a bonded laminated construction in the areas of over lap with the silicon chip in these areas being fixedly attached both to the transducer body and the bottom of the cup-shaped enclosure member 21.

Referring now to FIG. 4, in the preferred form of this invention, the silicon chip 27 may be of the type illustrated, in which elongated, narrow active gauge areas 43 and 45, respectively, are formed in appropriate locations on a single chip to constitute the tension and compression gauges. The tension gauge areas 43 consist of two narrow strips parallel to one another on either side of the center of the active diaphragm. The tension gauge areas 43 are each separated from compression gauge areas 45 by inactive contact areas 47, 48, 49, 50 and 51, which provide low-impedance contact between the adjacent active gauge areas. The chip 27 has an overall elongated, approximately rectangular shape with reduced width portions at either end. Each compression gauge has a U-shaped configuration consisting of two short active gauge area strips 45 jointed by a short, low-resistance cross contact area 53. This provides an active length disposed in an approximate radial direction which is effectively equal to the sum of the lengths of the two active gauge area strips 45.

Figure 5:
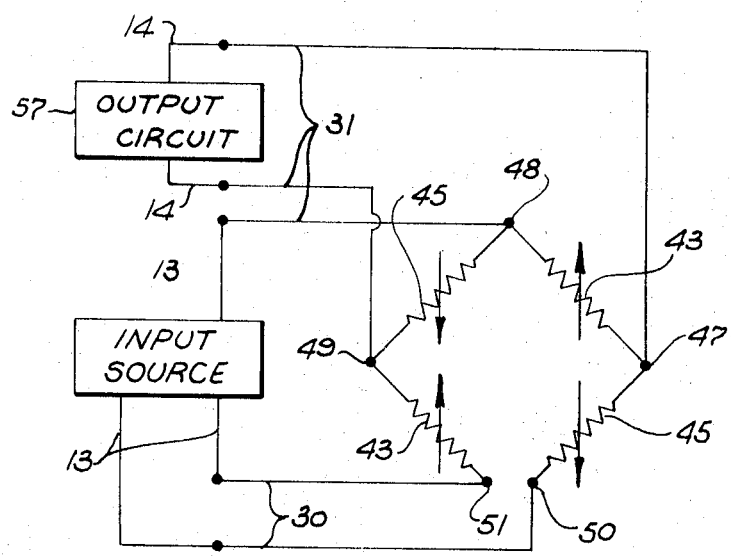

Referring now to FIG. 5, a schematic circuit diagram illustrates the bridge arrangement provided by the single silicon chip arrangement. The open connection between the contacts 50 and 51 provides a five-terminal bridge arrangement which permits incorporation of compensation circuitry for balancing the slight impedance discrepancies in the different legs of the bridge. A DC input excitation is supplied from a source 55, such as a battery or constant current source, through three of the wire leads 31 to the metal contacts 29 overlying the contact areas 48, 50 and 51, and the output from the bridge is supplied to an output circuit 57 from the metal contacts 29 overlying the contact areas 47 and 49 along the other two wire leads 31. Both the excitation source 55 and the output circuit 57 in practice are coupled from remote locations by the cable wires 13.

A desired chip configuration as shown in FIG. 4, may best be achieved by use of well-known planar techniques commonly employed in the production of integrated circuits. The particular types of chips to be employed in the preferred embodiment of this invention are the types sold under trade designations SP-4 and SP-24 previously by Whittaker Corporation, and presently by the assignee of the present invention. Such integrated strain gauge transducer chips containing a five-terminal bridge arrangement have been commercially available for some time so that the complete details of their manufacture may not be considered herein. Briefly, the concept involved is one of utilizing a unitary semiconductor single crystal having adjacent zones of different conductivity types so that a high-impedance barrier is formed by a rectifying junction between zones of different conductivity type, thus electrically isolating adjacent zones without necessity of structural or thermal separation. The chip 27 preferably consists of a unitary single-crystal body of semiconductor material produced conventionally, as by growing a single-crystal silicon structure from a small seed crystal withdrawn from a silicon melt. In this example, the crystal is of N-type conductivity produced by introducing an N-type doping agent such as arsenic into the molten silicon. Thin wafers are sliced from the crystal body and lapped to an appropriate thickness, for example about 0.014 inch, and aligned with longitudinal and lateral dimensions extending in a desired crystallographical direction. An initial etching operation, commonly using an etching solution with equal parts of hydrofluoric, hydrochloric and acetic acids, is used to reduce the thickness of the wafer to remove any remaining surface damage caused by the lapping operations. With the planar diffusion technique, the resulting wafer is then oxidized at high temperature with or without steam to form a silicon dioxide layer 59 that insulates and protects the entire outer surface of the wafer. Using well-known photoresistive or other suitable techniques, grooves are etched in one surface of the wafer to define the shape of the individual chips 27. These area are then reoxidized to form a protective silicon dioxide coating.

In forming the active gauge and contact areas, a mask is carefully positioned over one of the flat surfaces of the wafer to which the photoresistive layer is applied. The mask is shaped to expose only those surfaces within each chip area surrounding the active gauge and contact areas. The unactivated photoresistive material is removed to uncover the active gauge and contact areas permitting a suitable oxide etching solution, such as hydrofluoric acid, to be applied to remove the silicon dioxide layer down to the surface of the crystal. The remaining etching solution is then removed by washing or application of a buffer solution, and the wafer thus prepared is placed in a diffusion furnace containing a P-type dopant, such as boron, which is ten diffused into the exposed crystal surfaces to a depth of approximately 0.00025 inch, commonly the desired depth for producing the narrow piezoresistive active gauge areas. This results in the relatively lightly doped P-type region on all of the exposed crystal surface areas.

The crystal is then reoxidized and covered with photoresistive material to cover the previously exposed areas now doped to form P-type regions. Then another mask outlining the contact areas 47, 48, 49, 50, 51 and 53 on each chip is carefully positioned on the wafer with the etch being applied to the resulting exposed areas to remove the most recently applied silicon dioxide layer. After the protective silicon dioxide layer is removed in the desired areas, the chip is again placed into a high-temperature diffusion furnace, this time containing a much higher concentration of P-type dopant, such as boron, to increase the P-type impurity level in the contact areas to produce what is commonly known as P+ region. The P+ regions provide an extremely low resistance path between the adjacent P-type regions. Again, a protective silicon dioxide layer is formed over the entire wafer, and another mask is positioned to uncover the areas at the center of the P+ contact areas 47, 48, 49, 50 and 51, this time to permit evaporative deposition of the metal contacts 29. The heavily doped P+ region in contact with the evaporated metal contact 29, which may for example be aluminum, provides a low-resistance ohmic connection of the leads 30 to the ends of the bridge elements defined on each chip.

Upon completing the evaporation of the contacts 47, 48, 49, 50 and 51 on each of the chip areas of the wafer, an oxide removing etch is applied to the entire opposite surface of the wafer to remove the protective silicon dioxide layer. Further etching of this surface removes the thickness of the silicon wafer to meet the bottom of the grooves previously etched to define the individual chip areas, thus separating the wafer into individual chips 27. The thin-gauge wire leads 31, preferably of gold, can then be soldered into place, or preferably "nailhead" bonded by thermocompression bonding, on the metallic contacts deposited at the center of the contact areas.

Of course, the particular chip configuration and its method of manufacture may be varied in accordance with the particular gauge parameters desired, and single-chip bridge arrangements such as employed in the preferred embodiment may be manufactured using other well-known semiconductor fabrication techniques, particularly those employed in the integrated circuit field. Alternatively individual piezoresistive chips for each gauge may be employed in accordance with the invention by individually cementing them in place in the desired locations on the diagram with the compressive gauges being cemented between the raised edge-supporting surface of the transducer body to provide the laminated sandwich construction for preventing slippage and locating the active gauge areas in the region of maximum strain outside the neutral circle 63, as shown in FIG. 4.

This laminated construction provides a firm, well-defined and static compression zone with a relatively simple diaphragm construction. The compression zone outside of the neutral circle 63 is extended radially inward further than with the simple edge supported diaphragm so that the active compression gauge areas 45 lie totally within the compression zone in the approximate location in the area of maximum compressive strain. In this way, the compressive gauge portions of the bridge arrangement made a substantial positive contribution to the total bridge output, typically at least 60 percent of the output that would be produced by the tension gauges alone. With the conventional edge-supported diaphragm pressure transducer using the same or a similar type chip, the compressive strain region might vary due to slippage caused by the end portions of the chip becoming unbonded from the diaphragm and the active compression gauge areas were typically located very close to or even intersected by the neutral circle so that the output contribution was either very small or actually detracted from the total output, when as frequently occurred, the compressive gauge areas were actually subjected to more tension strain than compressive strain. As a result, the pressure transducers in accordance with this invention, provide output signals with superior linearity, greatly reduced hysteresis, and substantial repeatability to maintain the gauge output and accurate measure of the pressure phenomenon being measured. In addition, the additional bonding on both sides of the silicon chip 27 results in overall strengthening to the entire mechanical structure, especially in providing increased mechanical support for the delicate silicon chip. The unique features of this invention provide a very accurate pressure transducer of extremely small size that is most useful in making point measurements in wind tunnel tests using miniature models of an aerodynamic shape. These transducers are also particularly useful because of their microminiature dimensions for use in biomedical applications, such as the measurements of blood pressure at specific points in the circulatory system by inserting the transducer through use of an appropriate catheter device into a vein or artery.

What is claimed is:

1. An improved pressure transducer comprising: an elongated hollow transducer body having an internal bore coaxial with the axis of elongation of the body and a flat supporting end surface surrounding the opening at the end of said bore;
an end closure member having a thin flexible flat wall extending across said end surface to cover the open end of said bore, said end closure member being bonded to said transducer body with opposing edges supported by said end surface to provide a central active diaphragm area corresponding to the dimensions of said bore;
flat semiconductor means having active piezoresistive strain gauge areas defined therein bonded to the inner surface of said thin flexible wall with a pair of elongated tension gauge areas disposed parallel to one another adjacent to center of said diaphragm area and a pair of compression gauge areas being disposed partially within said active gauge area with a portion extending outwardly past said active diaphragm area between said end surface and the inner surface of said flat wall; and,
adhesive means bonding said compression and tension gauge areas of said chip means to the inner surface of said flat wall and fixedly bonding said outwardly extending portion of said semiconductor means containing said compression gauge areas to said end surface to prevent slippage.

2. The improved pressure transducer in claim 1 wherein:
said internal bore is cylindrical in shape, said flat supporting end surface is annular in shape surrounding said cylindrical internal bore, and said flat wall is disc-shaped to cover said annular end surface and the end of said bore to define a circular active diaphragm area corresponding to the inner dimensions of said bore.

3. The improved pressure transducer of claim 1 wherein:
said semiconductor means comprises a single elongated silicon chip with active compression and tension gauge areas defined thereon in a bridge arrangement with intermediate contact areas, said compressive gauge areas each consisting of a U-shaped compressive gauge element formed at the opposite ends of said chip with the outer extremities of said U-shaped areas being bonded by said adhesive means to the abutting portions of said supporting end surface.

4. The improved pressure transducer of claim 1 wherein:
said end closure means comprises a cup-shaped metal member with a bottom wall defining said flat thin wall containing said active diaphragm area and with sidewalls being bonded to the outer surfaces of said transducer body.

5. An improved pressure transducer comprising:
diaphragm means having a thin flexible planar portion having an active diaphragm area, said diaphragm means having an outer pressure-receiving surface and an inner gauge-supporting surface;
flat compression strain gauge means bonded to said inner surface at the periphery of said active diaphragm area with an outer edge portion extending outward past the periphery of said active diaphragm area; and,
a body portion with edge support means having a flat end surface with the outer portion of said compression strain gauge means being fixedly bonded on opposite sides both to said inner gauge-supporting surface and to said flat end surface.

6. The improved pressure transducer of claim 5 further comprising:
tension strain gauge means bonded to said inner gauge-supporting surface adjacent the center of said active diaphragm area; and,
circuit means electrically connecting said tension and compression strain gauge means to produce mutually complementary output signals in response to a deflection of said diaphragm means within said active diaphragm area.

7. The improved pressure transducer of claim 6 wherein:
said compression and tension strain gauge means constitute different narrow piezoresistive strips defined on a single flat semiconductive chip, said flat compression strain gauge means consisting of two piezoresistive active areas near the periphery of said chip and said tension strain gauge means constituting a pair of elongated parallel piezoresistive active areas adjacent the center of said active diaphragm area at the center of said chip; and,
said connection means comprises low-resistance contact areas defined within said chip between the ends of said elongated piezoresistive active areas and the adjacent ends of said piezoresistive active areas constituting said compression strain gauge means.

8. The improved pressure transducer of claim 7 wherein:
each of said piezoresistive active areas constituting said compression strain gauge means comprise narrow piezoresistive strips parallel to one another and connected in series by additional low-resistance contact areas.

9. The improved pressure transducer of claim 8 wherein:
said flat end surface is bonded to the periphery of said chip at the outer extent of said piezoresistive strain gauge areas constituting said compression strain gauge mean so that said strain gauge means is located within said active diaphragm area outside a neutral circle defined between compression and tension areas resulting from concave deflection of said diaphragm.

* * * * *